US008678726B1

(12) United States Patent
Stubbs (10) Patent No.: US 8,678,726 B1
(45) Date of Patent: Mar. 25, 2014

(54) ANCHORING SYSTEM (71) Applicant: Kent A. Stubbs, Red Bluff, CA (US)

(72) Inventor: Kent A. Stubbs, Red Bluff, CA (US)

( * ) Notice: Subject to any disclaimer, the term of this patent is extended or adjusted under 35 U.S.C. 154(b) by 0 days.

(21) Appl. No.: 13/661,424

(22) Filed: Oct. 26, 2012

Related U.S. Application Data (63) Continuation-in-part of application No. 12/964,564, filed on Dec. 9, 2010, now abandoned.

(60) Provisional application No. 61/285,412, filed on Dec. 10, 2009.

(51) Int. Cl.
*B60P 3/079* (2006.01)

(52) U.S. Cl.
USPC ............................................. 410/23

(58) Field of Classification Search
CPC .................................. B62H 1/08; B62H 3/10
USPC ................................. 410/3, 7, 9–11, 19, 23
See application file for complete search history.

(56) References Cited

U.S. PATENT DOCUMENTS

| 3,297,293 | A | 1/1967 | Andrews |
| 3,366,256 | A | 1/1968 | Meredith |
| 3,675,833 | A | 7/1972 | Barr |
| 3,753,579 | A | 8/1973 | Kurilich |
| 3,765,637 | A | 10/1973 | Watts |
| 4,243,243 | A | 1/1981 | Edmisten |
| 4,580,935 | A | 4/1986 | Treihaft |
| 4,818,162 | A | 4/1989 | Zukowski |
| 4,842,458 | A | 6/1989 | Carpenter |
| 4,960,353 | A | 10/1990 | Thorndyke |
| 4,992,015 | A | 2/1991 | Florence |
| 5,259,711 | A | 11/1993 | Beck |
| 5,326,202 | A | 7/1994 | Stubbs |
| 5,338,136 | A | 8/1994 | Hetchler |
| 5,529,448 | A | 6/1996 | Kosma |
| 5,800,105 | A | 9/1998 | Stump |
| 5,823,723 | A | 10/1998 | Finch |
| 6,109,494 | A | 8/2000 | Pilmore |
| 6,171,034 | B1 | 1/2001 | Burgoon |
| 6,328,511 | B1 * | 12/2001 | Cardona ......................... 410/12 |
| 6,539,593 | B2 | 4/2003 | Morris |
| 6,616,388 | B1 | 9/2003 | Floe |
| 6,705,811 | B1 | 3/2004 | Selby |
| 6,715,972 | B2 | 4/2004 | Jackson |
| 7,025,545 | B1 | 4/2006 | Robison |
| 7,114,896 | B2 | 10/2006 | Lantrip |
| 7,168,575 | B2 | 1/2007 | Olsen |
| 7,198,443 | B2 | 4/2007 | Macomber |
| 7,287,942 | B1 | 10/2007 | VanValkenburgh |
| 7,316,530 | B2 | 1/2008 | Saldana |
| 7,347,653 | B1 | 3/2008 | Roberts |
| 7,416,373 | B2 | 8/2008 | Mock |
| 7,641,086 | B2 | 1/2010 | Green |
| 7,850,407 | B2 | 12/2010 | Burry |

(Continued)

FOREIGN PATENT DOCUMENTS

GB          2070523          9/1981

*Primary Examiner* — Hilary Gutman
(74) *Attorney, Agent, or Firm* — William Bodnar (57) ABSTRACT

An anchoring system utilized in securing and transporting a motorcycle or other vehicle includes a strap, a ratchet and at least one anchor device securable to the bed of a transport mechanism. An embodiment herein includes a remote anchor device that attaches at one end to the strap ratchet and at another end to the bed of a transport mechanism.

7 Claims, 7 Drawing Sheets

(56) References Cited

U.S. PATENT DOCUMENTS

| | | | |
|---|---|---|---|
| 8,439,610 B2 * | 5/2013 | Mamie | 410/3 |
| 8,517,646 B2 * | 8/2013 | Cencer | 410/20 |
| 2003/0059269 A1 | 3/2003 | Bosley | |
| 2006/0177283 A1 | 8/2006 | Terry | |
| 2007/0189873 A1 | 8/2007 | Breeden | |
| 2008/0124183 A1 | 5/2008 | Murphy | |
| 2008/0273937 A1 | 11/2008 | Hanson | |
| 2009/0232628 A1 | 9/2009 | Miller | |

* cited by examiner

ANCHORING SYSTEM

CROSS REFERENCE TO RELATED APPLICATIONS

This application is a continuation in part of U.S. Nonprovisional application Ser. No. 12/964,564 filed on Dec. 9, 2010 which claims the benefit of U.S. Provisional application 61/285,412 filed on Dec. 10, 2009. The contents of U.S. Nonprovisional application Ser. No. 12/964,564 and U.S. Provisional application 61/285,412 are incorporated herein by reference.

FIELD OF THE INVENTION

This present invention relates to an anchor system for securing a vehicle (typically a motorcycle, ATV, etc.) for transport.

BACKGROUND OF THE INVENTION

During transport of a vehicle (motorcycle, ATV, etc.) the forces incurred vary greatly, both in severity and direction, depending upon various factors. These include road conditions, driving habits, construction and condition of the transport mechanism and the user's understanding of the various methods of securing a vehicle for transport.

One of the known securing systems includes tying a motorcycle down with two separate ropes, one from each handle bar, which cause excessive wearing of motorcycle parts such as handle bar covering and gas tank paint. This method is also inherently difficult as it requires balancing the tension equally on the different tie downs.

Another system includes two interconnected straps with soft cuffs engaging the grips of the handle bar. This method reduces the damage to the handle bar covering and gas tank paint. However, the soft cuff design of the system allows handlebar grips to be exposed to a lateral pull that sometimes results in an inward "bunching" of the grips if the grips are not sufficiently glued to the throttle tube (on the right side) and handlebar (on the left side). In addition, under certain conditions this strapping system would contact with switch gear (horn, turn signal, and start buttons) causing unnecessary wearing of motorcycle parts.

Other tie down systems contain complex components that are difficult and expensive to install and are cumbersome to operate. In addition, many contain components that must be permanently affixed to the bed of a truck or transport vehicle/mechanism and adversely affect the use of the transport mechanism. Some also require an excessive amount of space in the transport vehicle for an operator to adjust and affix the tie down system whereas space is always at a premium in transport vehicles/mechanisms.

The anchoring system disclosed herein provides solutions to problems inherent in the related art.

SUMMARY OF EMBODIMENTS OF THE INVENTION

Embodiments of the present invention provide a new and improved anchoring system for securing vehicles (typically motorcycles or ATVs) for transport that reduces damage during the transport and provides greater vehicle stability. Embodiments of the present invention overcome certain undesirable properties inherent in the related art, while providing better overall results.

Embodiments of the invention include a securing strap that has engagement means on at least one end. The engagement means may be a loop, hook, shackle, or other device useful for attaching the strap to a frame member or interfacing component of the vehicle to be transported at a first end of the strap. A frame member or interfacing component is any substantial (sufficiently strong) bracketry or hardware that can act as a tie down point of the vehicle being transported, including, but not limited to, floor board and foot peg mounting hardware, engine mounting brackets or hardware, foot rests and frame components. The strap is attached to a ratchet assembly at a point away from the first end of the strap. The ratchet assembly is utilized to provide tensioning of the strap. The ratchet assembly is connected to an anchor that is typically secured directly to the bed of a truck, trailer, or other transport mechanism or vehicle.

Two embodiments disclosed herein are referred to as the "direct anchor" and the "remote anchor" versions. The direct anchor system utilizes a strap attachable to a vehicle frame member or interfacing component at a first end of the strap and a ratchet assembly attached to the strap away from the first end. The ratchet assembly is attached to an anchor device that is secured to a transport mechanism (a truck is illustrated). Typically there is a strap and ratchet for the left side of the vehicle being transported and another strap and ratchet for the right side of the vehicle.

The remote anchor version also utilizes a strap attachable to a frame member or interfacing component of a vehicle at a first end of the strap, and a ratchet assembly attached to the strap away from the first end. The remote anchor version utilizes two anchor devices. The first anchor device is the same anchor device utilized in the direct anchor embodiment and is used to position the strap in relation to the frame member or interfacing component (ex. a foot rest for a motorcycle) and provide support for the strap. The second (remote) anchor device is used to secure the ratchet assembly to a truck bed (for example) at the front, side or rear of the bed of the transport vehicle/mechanism.

BRIEF DESCRIPTION OF DRAWINGS

The invention is illustrated in the following drawings.

DETAILED DESCRIPTION OF THE PREFERRED EMBODIMENTS

Figure 1:
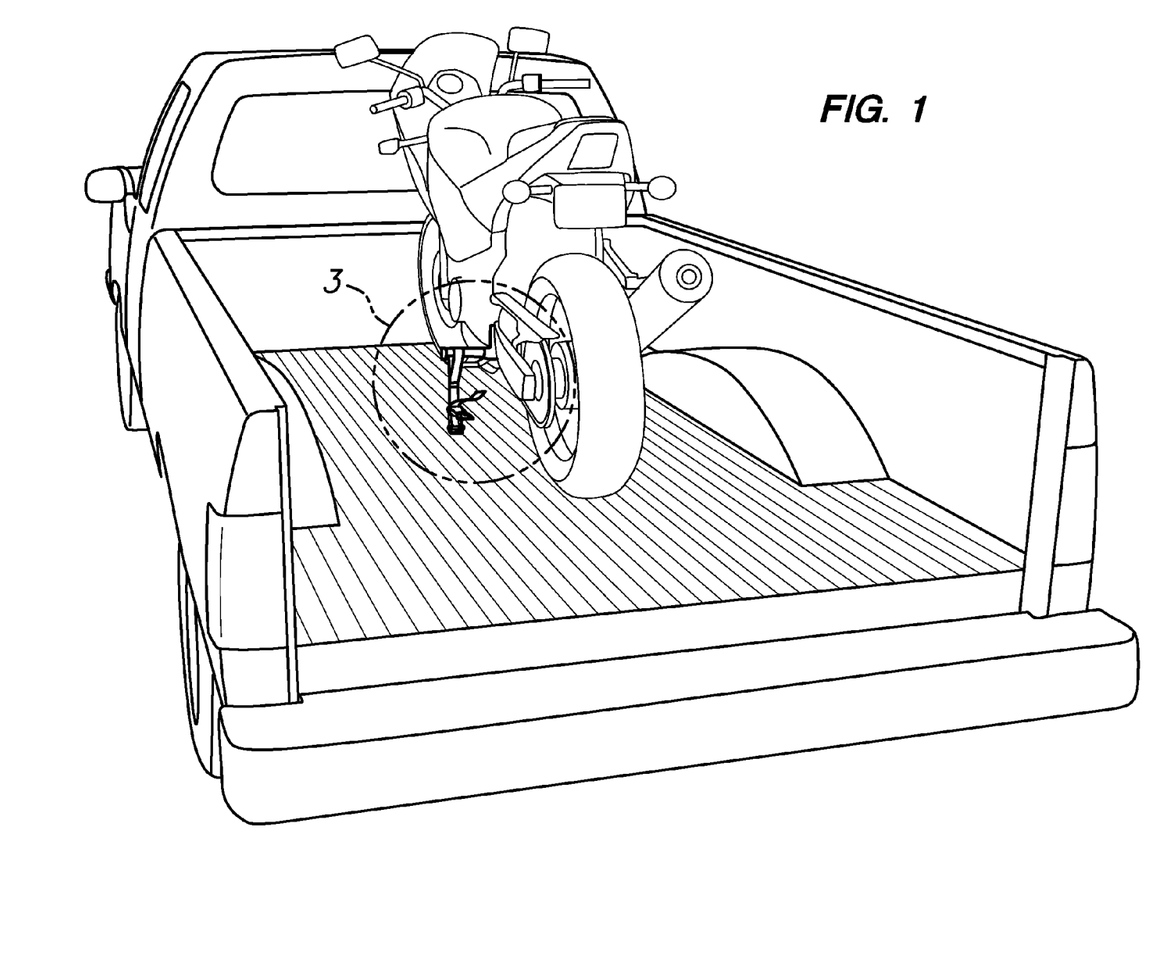
FIG. 1 schematically shows the direct anchor version of the anchoring system securing a motorcycle to the bed of a truck.
Figure 2:
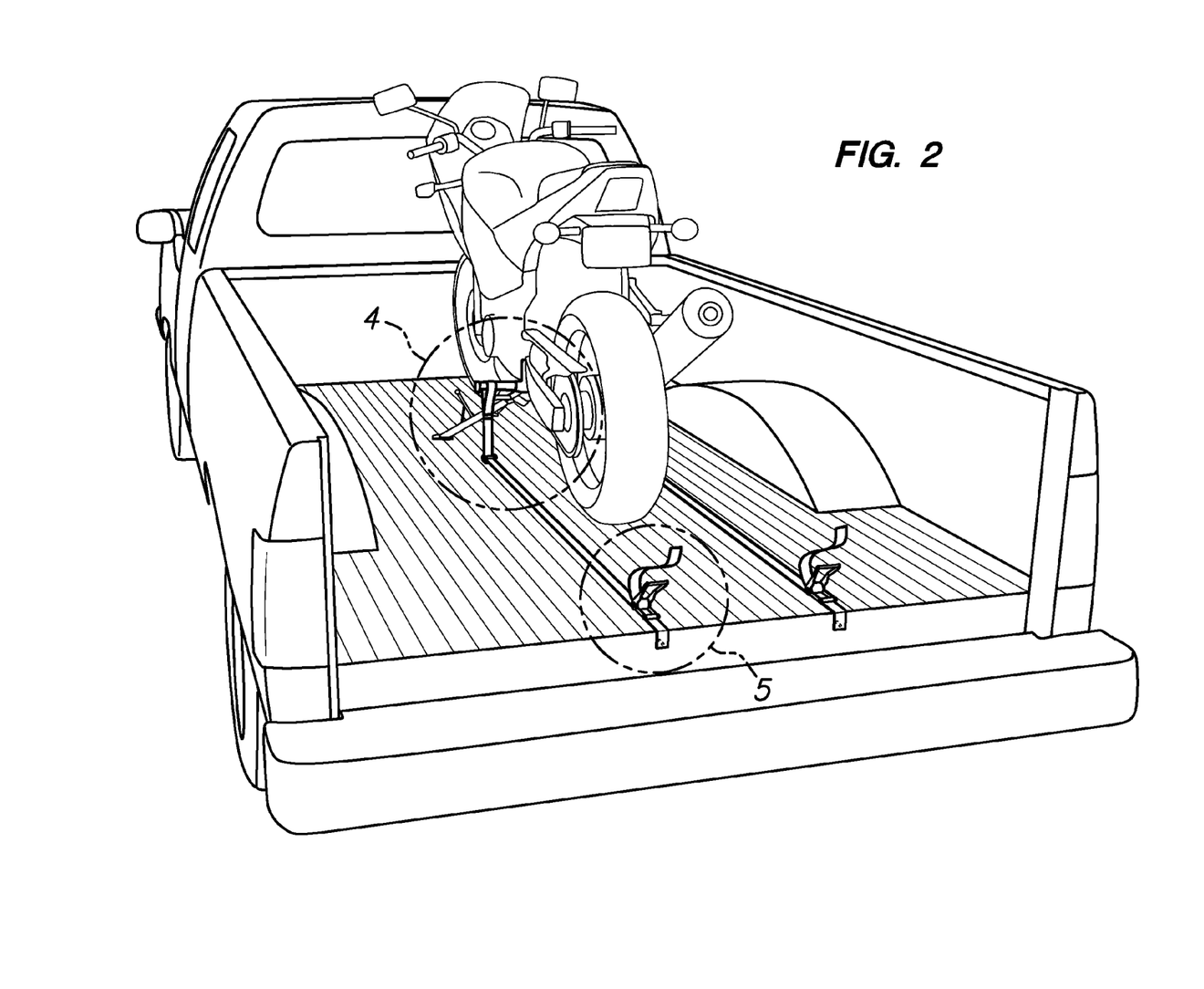
FIG. 2 schematically shows the remote anchor version of the anchoring system securing a motorcycle to the bed of a truck.

In FIG. 1, a direct anchor anchoring system in accordance with the present invention is shown securing a motorcycle to the bed of a truck. FIG. 2 shows an anchoring system utilized with a remote anchor attached at the rear of a truck bed. It should be noted that two anchoring assemblies are typically used (one on the right side and one on the left side of the vehicle being transported) to secure the vehicle to the transport mechanism as shown in FIG. 2.

Figure 3:
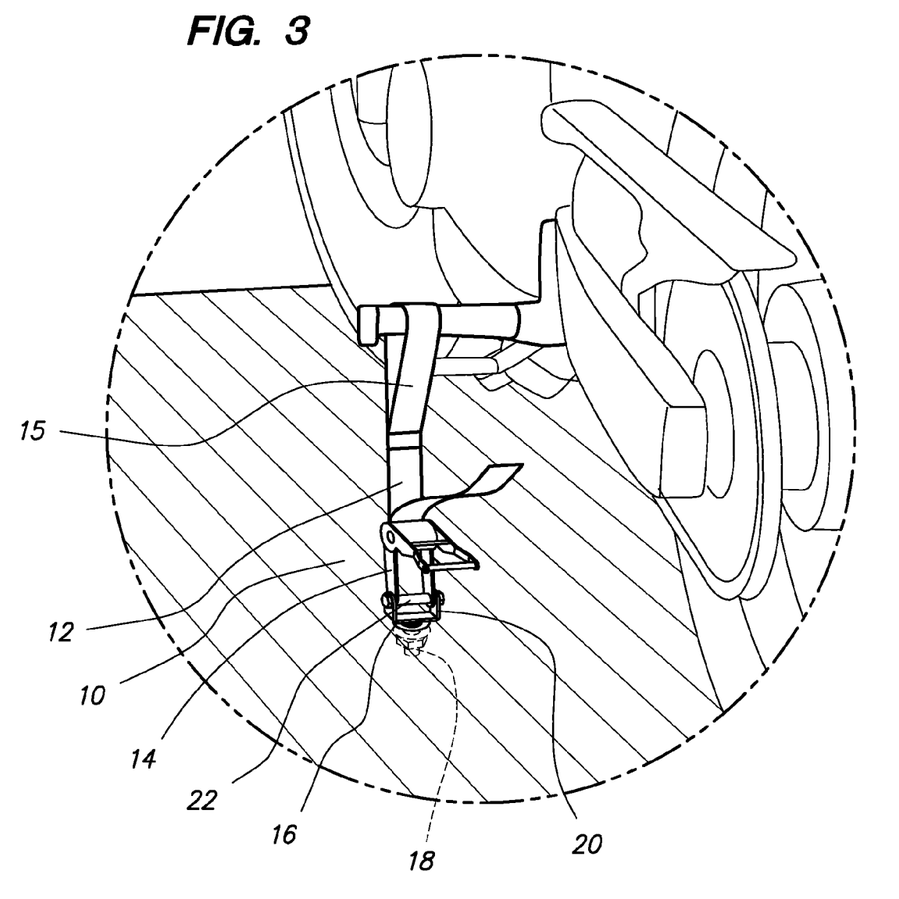
FIG. 3 shows a detailed view of the direct anchor version shown in FIG. 1.
Figure 7:
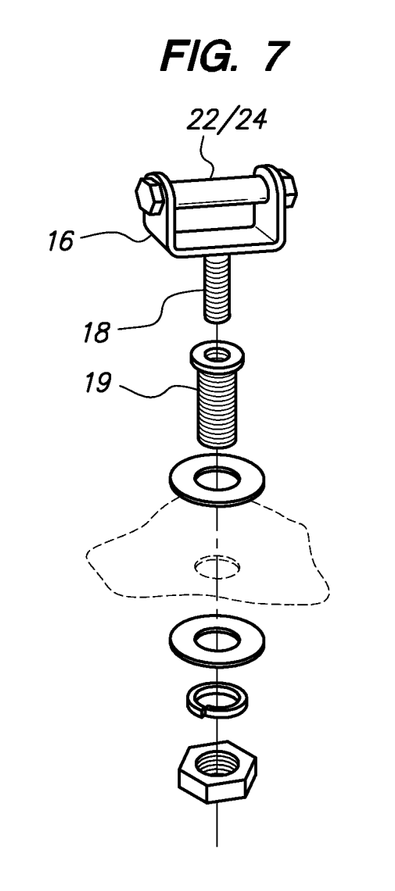
FIG. 7 includes a close-up of the yoke and anchor components of the direct anchor version of the anchoring system.

The components of the direct anchor anchoring system 10 are more clearly shown in FIG. 3 and FIG. 7. The direct anchor system includes a strap 12, a strap ratchet 14 and a universal anchor yoke 16. The strap 12 is connected to the foot rest of a motorcycle via engagement means (a loop 15 for example) at a first end and to a strap ratchet 14 away from the first end. The strap ratchet is attached directly to an anchor yoke assembly (in the direct anchor embodiment) which includes a yoke portion 16 and an anchor portion 19.

The universal yoke has a horizontal base section and two upright arms 20 extending from the opposite ends of the base section. The securing component 18 is affixed to and extends from the bottom of the base section of the yoke portion. The securing component 18 is typically a bolt or pin. The securing component 18 is rotatably connected to the anchor component 19 that penetrates (and is anchored to) the bed of the truck (or similar transport mechanism). A threaded insert (fitted into the truck bed) can be utilized in some instances. In the direct anchor version, the universal yoke assembly (yoke portion 16 and anchor portion 19) are utilized as a direct anchor.

The strap ratchet 14 is typically connected to the universal yoke 16 via a pin 22 and/or bolt inserted through holes in the upright legs 20 of the yoke portion 16. A sleeve 24 can also be utilized. The strap ratchet is utilized to adjust the tension of the strap and secure the strap in position.

Figure 4:
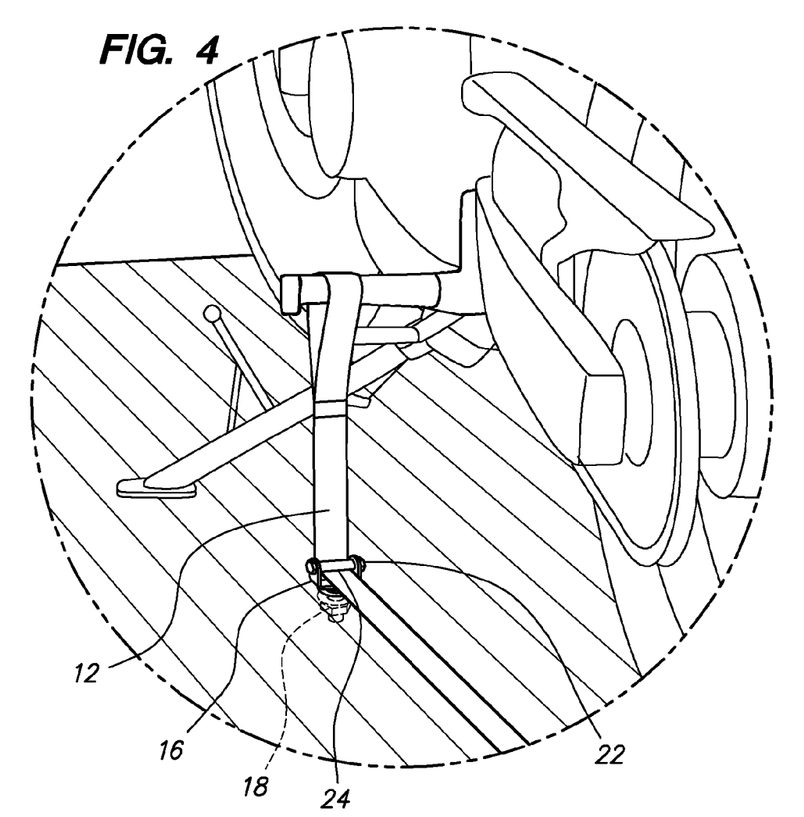
FIGS. 4 and 5 show detailed views of the remote anchor version shown in FIG. 2.
Figure 5:
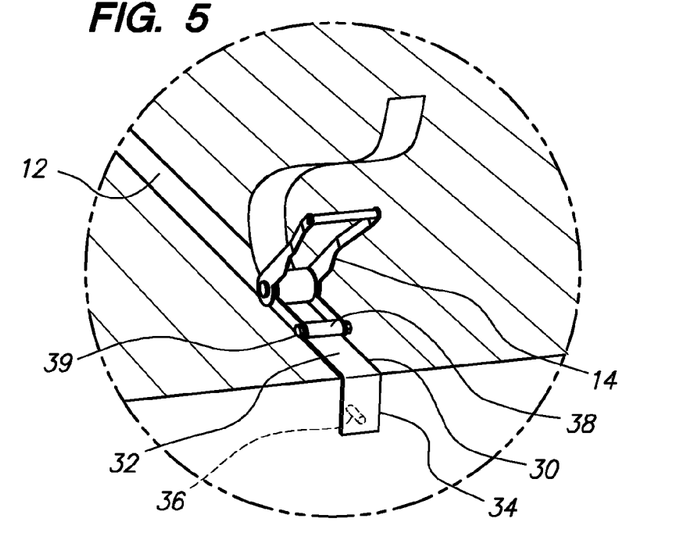

FIGS. 4 and 5 show the components of the remote anchor version of the anchoring system. In the remote anchor system the strap is attached to a frame member or interfacing component (a foot rest of a motorcycle is shown). The strap is routed through (and connected to) the universal yoke 16 between the horizontal base section of the yoke and, for example, a sleeve 24 fitted over the bolt or pin 22. The strap continues towards the rear of the truck bed where it is connected to a strap ratchet 14. The strap ratchet is connected to a remote anchor plate 30 at the cylindrical end 38 of the remote anchor plate via fastener 39. The opposite end of the remote anchor plate is attached to the rear of the truck bed.

Figure 6:
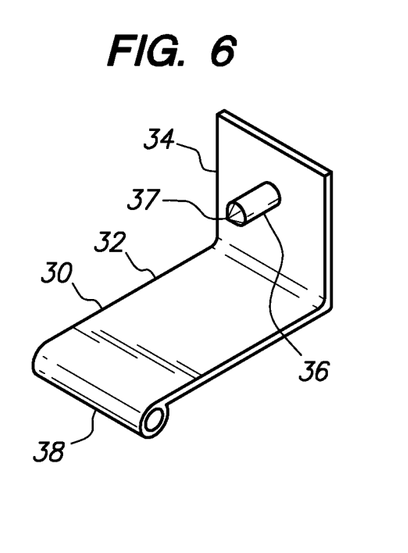
FIG. 6 shows a perspective view of the remote anchor plate device.

The remote anchor plate device 30 has a horizontal leg or portion 32 and a vertical leg or portion 34 substantially orthogonal to each other as shown in FIG. 6. One end of the horizontal leg has a formed, substantially hollow cylindrical configuration 38 which, when fitted between the ends of the ratchet bracket, can contain a bolt or pin passing through the ratchet bracket. Thus the strap ratchet can be secured to the remote anchor via a bolt or pin or similar securing mechanism. The vertical portion has a marking and securing component 36 attached to the bed-facing (inner) side of the leg. The marking and securing component (typically of cylindrical configuration) has a tapered point 37 at the end that can be utilized to mark the placement of a hole to be drilled into the front, side or back edge of a truck bed (for example). The securing component is then inserted into the drilled hole and the strap ratchet can be connected and adjusted to secure the vehicle to be transported.

Figure 8:
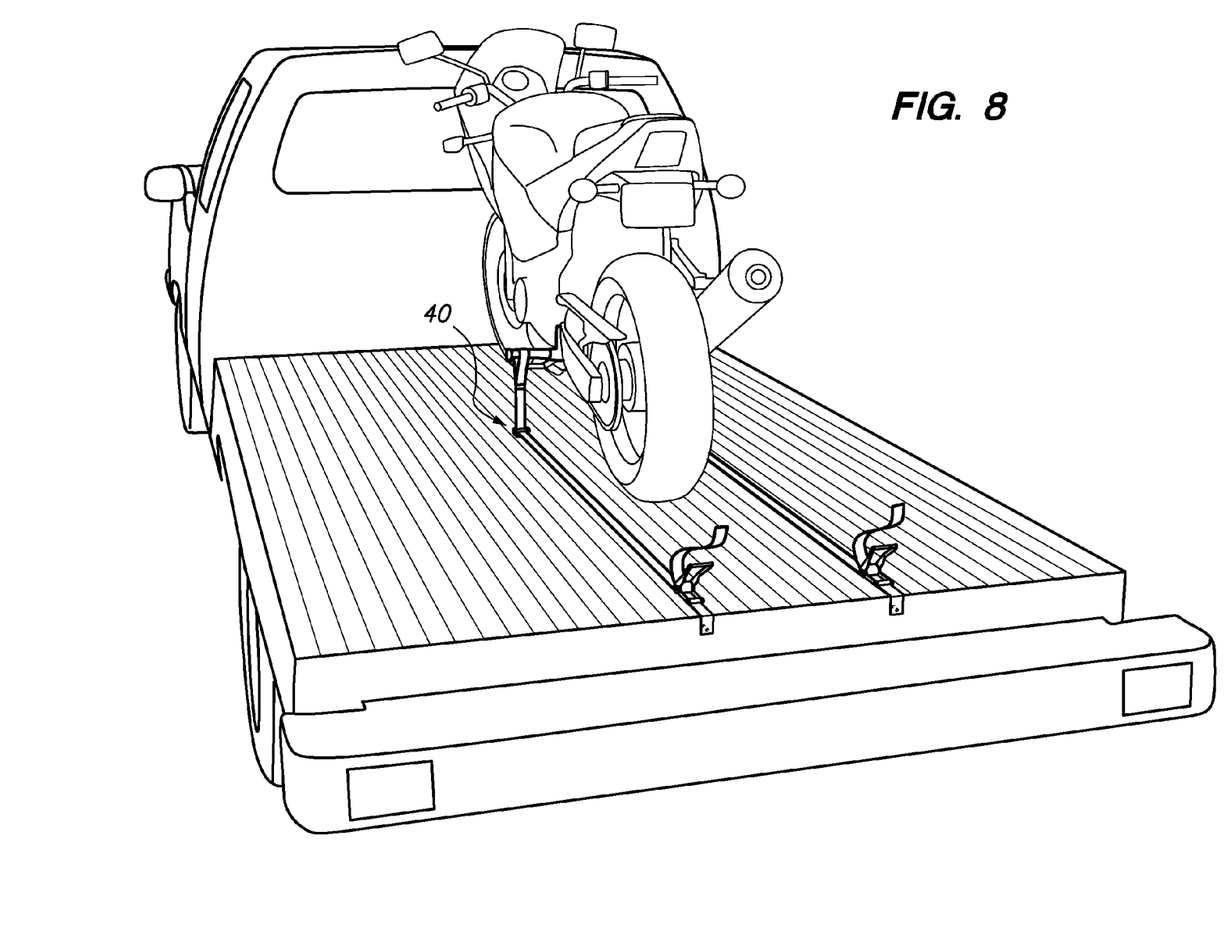
FIG. 8 schematically shows the remote anchor version of the anchoring system securing a motorcycle to a flat bed of a truck.
Figure 9:
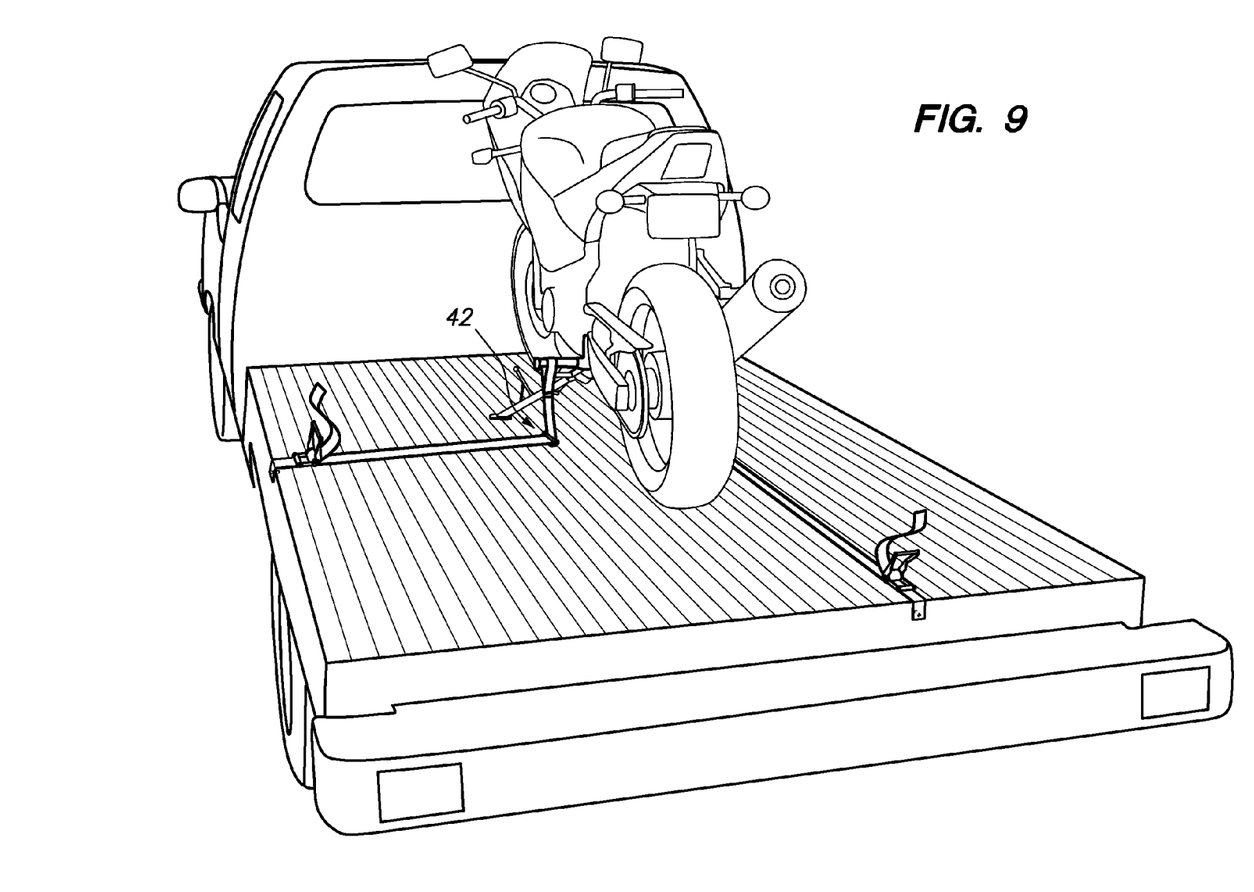
FIG. 9 schematically shows the remote anchor version of the anchoring system utilizing a side mount and rear mount.

FIG. 8 shows the remote anchor version of the anchor system installed at the rear of the bed of a transport mechanism. FIG. 9 shows the remote anchor version of the anchor system installed at the side and the rear of the bed of a transport mechanism. The orientation (40) of the yoke is parallel to the foot peg when the remote anchor is connected at the rear of the bed as shown in FIG. 8. The orientation (42) of the yoke is perpendicular to the foot peg when the remote anchor is connected at the side of the bed as shown in FIG. 9. The ability to utilize the remote anchor version from any side of the bed while utilizing the same rotatable yoke (and anchor) is a unique characteristic of embodiments of the invention.

CONCLUSIONS, OTHER EMBODIMENTS, AND SCOPE OF INVENTION

Although the illustrations show embodiments of the invention utilized to secure a motorcycle for transport, the embodiments can be used to secure any vehicle that has frame members or interfacing components to which a strap can be attached. The embodiments allow a user to quickly attach the components of the invention to the bed of a truck (or other forms of transport) and quickly adjust the tension of the straps to secure a motorcycle (or other vehicle) to the bed of the transport means.

The components utilized in embodiments of the present invention are easily installed and easily removed. The universal anchor yoke assembly can be quickly installed on the bed of a truck (or other transport means) utilizing the anchor portion 19. Typically the anchor portion/component 19 is first secured to the bed of a transport mechanism. The anchor portion 19 can be fitted through a hole in the bed of the transport mechanism and securely attached utilizing washers and nuts as seen in FIG. 7. The outside of the anchor component 19 can be threaded if desired. In one embodiment, the interior of the anchor component can include a threaded section to accept threads of the securing component 18 of the universal yoke 16.

As noted, the anchor component 19 would first be attached to the bed of the transport vehicle. The yoke 16 could then be connected to the anchor portion by rotating the yoke members 16, 18 to screw them into the anchor portion 19. When the universal yoke is hand tight, the user can adjust the yoke so that the bolt 22 or sleeve 24 is approximately parallel (FIGS. 1, 3) or perpendicular (FIG. 9) to the frame member or interfacing component. Thus, the yoke can be rotatably connected to the bed of the transport mechanism via the anchor portion. Other embodiments are contemplated that allow the yoke portion to be rotatably connected to the anchor portion without utilizing a threaded connection. In all embodiments only a hole or insert will remain in the bed of the transport mechanism upon removal of the yoke. The hole or insert can be capped when not in use.

The components of the direct anchor version can be utilized with additional components to comprise a remote anchor version of the anchoring system. The additional components could include a cylindrical bearing or roller and a remote anchor device. In the direct anchor version, the universal yoke is utilized to directly connect the strap and strap ratchet to the bed of a truck or trailer. In the remote anchor version, the universal yoke is utilized to redirect the path of the strap (from vertical to horizontal) and affect the forces accordingly. The universal yoke acts in part as a positioning anchor in the remote anchor version. Thus the ratchet is indirectly connected to the universal yoke 16 via the strap and the pin, bolt 22 or sleeve 24 of the yoke.

Thus the remote anchor version utilizes a universal yoke and a remote anchor plate. The remote anchor is inserted into a hole at the front, side, or back end of a transport mechanism. The remote anchor plate can also be easily removed when not in use and only a small, unobtrusive opening will remain. This opening can also be capped if desired. The horizontal surface of the bed of the transport mechanism does not have to be altered or modified to accept a remote anchor. The remote anchor plate is fitted into a hole in the edge surface of the bed at the front, side or back end.

The strap ratchet is indirectly connected to the direct anchor via the strap for the remote anchor embodiment. Attachment of the strap to the strap ratchet occurs at a point (or points) away from the first end of the strap. In other words, the strap-to-strap ratchet connection occurs away from the first end but not necessarily at the second end of the strap. The strap ratchet is used to adjust the tension of the strap on frame member or interfacing component and also utilized to lock the strap in position to secure the vehicle to the transport mechanism.

The orientations of various components have been described herein as being substantially parallel or substantially orthogonal to other components. The term "substantially" used herein means that a deviation of up to 30 degrees is contemplated. In addition, placement of an anchor component below a foot rest, for instance, does not necessitate placement of the component directly underneath the foot rest (or suitable frame member). For example a left side anchor component could be placed to the front of a foot rest and a right side anchor component could be placed to the rear of a foot rest for stability and meet the requirements of being below the foot rest (or frame member).

Typically the transport mechanism will be a truck. However other transport mechanisms are suitable including, but not limited to, trailers, boats, barges, trains, etc.

The above description presents the best mode contemplated in carrying out the invention. However, it is susceptible to modifications and alternate constructions from the embodiments shown in the drawings and accompanying description. Consequently it is not intended that the invention be limited to the particular embodiments disclosed. On the contrary, the invention is intended to cover all modifications, sizes and alternate constructions falling within the spirit and scope of embodiments of the invention.

What is claimed is:

1. An anchoring system for securing a vehicle to the bed of a transport mechanism comprising:
    a first and second strap, each having a loop, hook, or fastener secured at one end;
    a first and second anchor yoke assembly removably securable to the bed of the transport mechanism, each anchor yoke assembly including a yoke portion and an anchor portion, each yoke portion adapted to accept a free end of the first and second strap; and
    a first and second tensioning ratchet, each tensioning ratchet attachable directly or indirectly to the first and second anchor yoke assembly respectively and each tensioning ratchet integrated onto the first and second strap respectively;
    wherein the first and second straps are attachable via the loop, hook, or fastener, to a left and right frame member or interfacing component of the vehicle at rest on the bed of the transport mechanism, the anchor yoke portions of the anchor yoke assemblies rotatably secured to the anchor portions, the anchor portions in turn secured directly to the bed of the transport mechanism below the frame members or interfacing components, and wherein the first and second tensioning ratchets are manipulated to cinch and lock the straps at sufficient tension to secure the vehicle during transportation;
    a first and second remote anchor plate disposed substantially in line with the first and second anchor portions of the anchor assemblies and securable to the front, side, or rear edges of the bed of the transport mechanism, the ratchets attachable to the first and second remote anchor plates;
    wherein the remote anchor plates each include:
        a first plate portion having a substantially parallel orientation with the surface of truck bed, the first plate portion having an inner side and an outer side, and a substantially hollow cylindrical configuration integral with or attached to the outer side of the first plate portion, the cylindrical configuration adapted to accept a dowel, pin, bolt or similar securing component;
        a second plate portion having a substantially vertical orientation against the edge of the truck bed, the second plate portion having an inner side and an outer side the first and second plate portions contiguously formed and substantially orthogonal to one another, the second plate portion further including a positional marking and securing component having a first end and second end, the first end tapered to a point, the second end fastened to the inner side of the second plate portion at a strategic location, the marking and securing component projecting from the inner side of the second plate portion substantially parallel to the first plate portion.

2. The anchoring system of claim 1 wherein the ratchets are attachable to the first and second remote anchor plates respectively using a fastener.

3. The system of claim 1, wherein the vehicle is a motorcycle and the transport mechanism is a truck.

4. The system of claim 1, wherein the anchor portions of the anchor yoke assemblies are attachable to the bed of the transport mechanism using threaded inserts.

5. The system of claim 1, wherein the strap tensioning is applied by ratcheting on both sides of the vehicle, the applied tension between the frame members or interfacing components and the bed of the transport mechanism.

6. The system of claim 1 wherein the strap tensioning is applied by ratcheting at the remote anchor plates on both sides of the vehicle, the straps routed from the frame member or interfacing component, down through the anchor portions of the anchor yoke assemblies, and along the bed of the transport mechanism to the ratchets.

7. The system of claim 1 wherein said first and second anchor assemblies comprise:
    a horizontal base section,
    two upright arm sections substantially orthogonal to said base section, each said arm section having at least one opening provided therethrough,
    an anchor yoke pin connected to and extending substantially orthogonally from the underside of the horizontal base section.

* * * * *